United States Patent
Fakoorian et al.

(10) Patent No.: US 11,785,420 B2
(45) Date of Patent: Oct. 10, 2023

(54) ANGLE-BASED POSITIONING IMPROVEMENTS IN PRESENCE OF NON LINE OF SIGHT REFERENCE SIGNALS

(71) Applicant: Apple Inc., Cupertino, CA (US)

(72) Inventors: Seyed Ali Akbar Fakoorian, San Diego, CA (US); Wei Zeng, Saratoga, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 17/219,637

(22) Filed: Mar. 31, 2021

(65) Prior Publication Data

US 2022/0322035 A1    Oct. 6, 2022

(51) Int. Cl.
| | |
|---|---|
| H04W 4/02 | (2018.01) |
| H04W 4/029 | (2018.01) |
| G01S 5/08 | (2006.01) |
| G01S 5/02 | (2010.01) |

(52) U.S. Cl.
CPC ........... *H04W 4/029* (2018.02); *G01S 5/0218* (2020.05); *G01S 5/08* (2013.01)

(58) Field of Classification Search
CPC ......... G01S 5/08; G01S 5/0218; H04W 4/029
See application file for complete search history.

(56) References Cited

U.S. PATENT DOCUMENTS

| | | | | |
|---|---|---|---|---|
| 11,277,180 | B1* | 3/2022 | Raghavan | H01Q 3/2617 |
| 11,647,361 | B2* | 5/2023 | Yerramalli | G01S 5/02216 |
| | | | | 455/456.1 |
| 2017/0041097 | A1* | 2/2017 | Kim | H04J 11/0023 |
| 2022/0070028 | A1* | 3/2022 | Yerramalli | H04L 25/0212 |
| 2022/0201676 | A1* | 6/2022 | Kumar | H04W 72/048 |
| 2022/0373635 | A1* | 11/2022 | Bao | H04L 5/0048 |

OTHER PUBLICATIONS

Technical Specification entitled "3rd Generation Partnership Project; Technical Specification Group Radio Access Network; NR; Physical layer procedures for data (Release 16)"; 3GPP, New Radio, Layer 1; 3GPP TS 38.214 V16.5.0 (Mar. 2021) in 171 pages.
Technical Specification entitled "3rd Generation Partnership Project; Technical Specification Group Radio Access Network; NR; Physical layer measurements; (Release 16)"; 3GPP, New Radio, Layer 1; 3GPP TS 38.215 V16.4.0 (Dec. 2020) in 25 pages.
Technical Specification entitled "3rd Generation Partnership Project; Technical Specification Group Radio Access Network; NG Radio Access Network (NG-RAN); Stage 2 functional specification of User Equipment (UE) positioning in NG-RAN (Release 16)"; 3GPP TS 38.305 V16.4.0 (Mar. 2021) in 119 pages.

* cited by examiner

*Primary Examiner* — Dai Phuong
(74) *Attorney, Agent, or Firm* — Kilpatrick Townsend & Stockton

(57) ABSTRACT

The present application relates to devices and components including apparatus, systems, and methods for enhanced angle-based positioning calculations.

18 Claims, 10 Drawing Sheets

ANGLE-BASED POSITIONING IMPROVEMENTS IN PRESENCE OF NON LINE OF SIGHT REFERENCE SIGNALS

BACKGROUND

Third Generation Partnership Project (3GPP) Technical Specifications (TSs) define standards for wireless networks. These TSs include numerous details relating to calculating a position of a user equipment (UE). Work in this field is ongoing.

DETAILED DESCRIPTION

Figure 1:
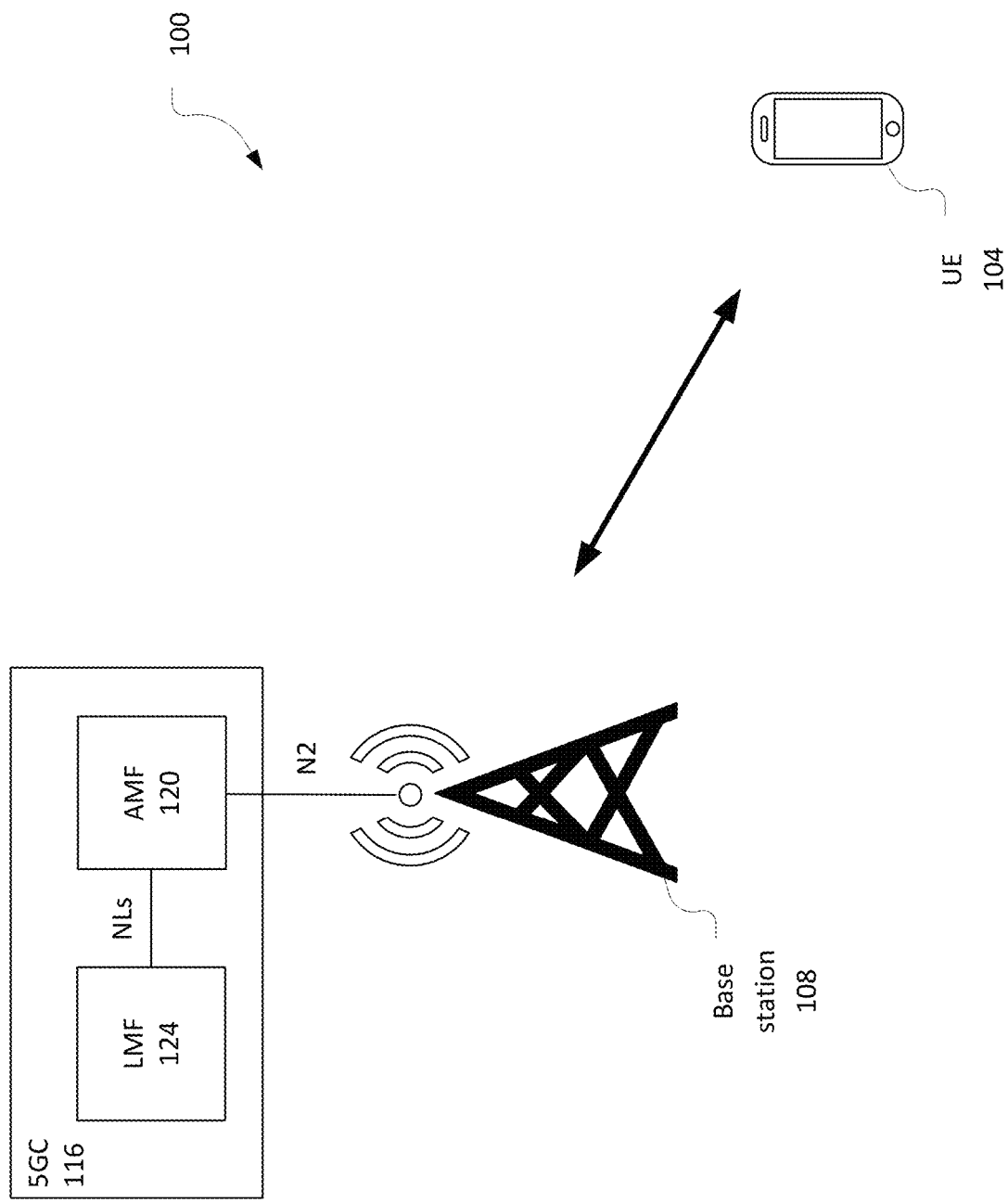
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, or techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include a UE 104 communicatively coupled with base station 108. The UE 104 and the base station 108 may communicate over air interfaces compatible with 3GPP TSs such as those that define Long Term Evolution (LTE) and Fifth Generation (5G) new radio (NR) system standards. The base station 108 may provide one or more LTE evolved universal terrestrial radio access (E-UTRA) cells to provide E-UTRA user plane and control plane protocol terminations toward the UE 104, or one or more 5G NR cells to provide NR user plane and control plane protocol terminations toward the UE 104. In general, a base station that provides a 5G NR air interface may be referred to as a gNB and the base station that provides an LTE air interface may be referred to as an eNB.

The base station 108 may include or otherwise control one or more transmission-reception points (TRPs), such as antenna panels, or remote radio heads (RRHs). As used herein and unless otherwise specified a TRP may be a node that can both transmit and receive, a transmit-only node, or a receive-only node. For example, a TRP may include a transmit-only node that is configured to transmit downlink positioning reference signals (PRSs).

The base station 108 may be coupled with the 5G core network (5GC) 116 by a backhaul connection. The 5GC 116 may provide the UE 104 with communication services to the UE 104. The 5GC 116 may include network elements that offer various data and telecommunications services to customers/subscribers (for example, a user of UE 104) who are connected to the 5GC 116 via the base station 108. The components of the 5GC 116 may be implemented in one physical node or separate physical nodes.

The base station 108 may be coupled with an access and mobility function (AMF) 120. The AMF 120 may be responsible for registration management (e.g., for registering UE 104), connection management, reachability management, mobility management, lawful interception of AMF-related events, and access authentication and authorization. The AMF 120 may be coupled with a location management function (LMF) 124 via an NLs interface.

The AMF 120 may send a location services request to the LMF 124 with respect to the UE 104. The location services request may be initiated by the AMF 120 or another entity. In response to the request, the LMF 124 may transfer assistance data to the UE 104 to assist with positioning operations. The assistance data may be tailored to the type of positioning operation that is to be performed. In general, the assistance data may include information about access nodes in the vicinity of the UE 104 and reference signal parameters corresponding to reference signals transmitted by the access nodes, which form a basis for the positioning measurements. The reference signal parameters may include, for example, bandwidth, frequency, or periodicity.

The LMF 124, which may also be referred to as a positioning server, may configure the UE 104 or base station 108 with assistance data of reference signals that may be transmitted by a first network device and measured by a second network device. The measurements may then be used as a basis for either uplink or downlink positioning operations. In the event the measurements are used for downlink positioning operations, the first network device may be the base station 108 and the second network device may be the UE 104. In the event the measurements are used for uplink positioning operations, the first network device may be the UE 104 and the second network device may be the base station 108.

The UE 104 or the base station 108 may perform positioning measurements based on assistance data of reference signals received from the LMF 124. In some embodiments, the positioning measurements may support time-based positioning techniques or angle-based positioning techniques. Some of these techniques are described below.

A DL-angle of departure (AoD) positioning operation may use measured DL-PRS-reference signal receive power (RSRP) of downlink signals received from TRPs at the UE 104. The UE 104 may measure the DL-PRS-RSRP of the received signals using assistance data received from the LMF 124. The measurements may then be used, along with other configuration information, to locate the UE 104 with respect to the neighboring TRPs. Unless otherwise described herein, a DL-AoD positioning operation may be similar to that described in section 8.11 of 3GPP TS 38.305 v16.3.0 (2020-12).

A DL-TDOA positioning operation may utilize DL reference signal time difference (RSTD) or DL-PRS-RSRP measurements of downlink signals received from TRPs at the UE 104. The UE 104 may measure the DL-RSTD or DL-PRS-RSRP of the received signals using assistance data from the LMF 124. Unless otherwise described herein, a DL-TDOA positioning operation may be similar to that described in section 8.12 of 3GPP TS 38.305.

An uplink (UL)-TDOA positioning operation may utilize UL-relative time of arrival (RTOA) or UL-sounding reference signal (SRS)-RSRP measurements of uplink signals transmitted by the UE 104 and received by TRPs. The TRPs may measure the UL-RTOA or UL-SRS-RSRP of the received signals using assistance data from the LMF 124. The resulting measurements may be used along with other configuration information to estimate a location of the UE 104. Unless otherwise described herein, a UL-TDOA positioning operation may be similar to that described in section 8.13 of 3GPP TS 38.305.

A UL-angle of arrival (AoA) positioning operation may utilize measured azimuth and zenith AoA at TRPs based on uplink signals transmitted by the UE 104 and received by the TRPs. The TRPs may measure the azimuth/zenith AoAs of the received signals using assistance data from the LMF 124. The resulting measurements may be used along with other configuration information to estimate the location of the UE 104. Unless otherwise described herein, an UL-AoA positioning operation may be similar to that described in section 8.12 of 3GPP TS 38.305.

Embodiments of the present disclosure describe positioning operations with enhanced positioning accuracy in situations in which a reference signal that forms a basis for positioning measurements is received at a network device by a non-line-of-sight (NLOS) path. Embodiments describe procedures, measurements, reporting, and signaling to improve accuracy of angle-based positioning techniques including, for example, UL-AoA and DL-AoD.

Some embodiments describe a network device (for example, the UE 104 or base station 108 (or TRP of the base station 108) performing measurements on reference signals to support an AoD or angle of arrival AoA positioning operation. The device may then generating a report based on the measurements. The report may include the measurements or location information based on the measurements. The report may also include an indication of whether effects of NLOS paths of the reference signals were identified or mitigated in the performing of the measurements. As will be described herein, the NLOS effects may be identified or mitigated by performing the measurements based on a time window or by determining a relative power of a first path of a reference signal of the measured reference signals to an RSRP of the reference signal in accordance with some embodiments. The device may transmit the report to the LMF 124.

Embodiments may be applicable to both UE-based or UE-assisted positioning operations. A UE-based positioning operation may include the UE 104 both performing the measurements and the related location calculations based on the measurements. Information related to the location calculations (for example, DL-AoD) may be fed back to the LMF 124. A UE-assisted positioning operation may include the UE 104 performing the measurements and feeding the measurements back to the LMF 124, which may perform the location calculations.

Embodiments may also be applicable to both base station-based or base station-assisted positioning operations. A base station-based positioning operation may include the base station 108 both performing the measurements and the related location calculations (for example, UL-AoA) based on the measurements. Information related to the location calculations may be fed back to the LMF 124. A base station-assisted positioning operation may include the base station 108 performing the measurements and feeding the measurements back to the LMF 124, which may perform the location calculations.

Angle-based positioning techniques may encounter positioning inaccuracy due to several reasons. First, inaccuracy may be introduced by deviation from panel orientation at a transmitter or receiver. Second, inaccuracy may be introduced by residual phase error that is not fully compensated at the baseband. Third, inaccuracy may be introduced by an NLOS effect. In general, the first and second points may be estimated and compensated by calibration techniques.

The NLOS effect may impact the positioning accuracy as follows. RSRP measurements associated with a reference signal that serves as a basis for positioning measurements, for example, PRS for DL-AoD, may not be tied to the first detected path in time. The DL-PRS-RSRP for each beam may be measured on received power across all the detected paths. Then the UE's location is estimated by the DL-PRS-RSRP measurements associated with the multiple beam directions. If a NLOS path is stronger than a line-of-sight (LOS) path, which may be quite possible in frequency range 2 (FR2) and above (for example, above 24.25 GHz) when there is blockage to the LOS path, the AoD estimated based on the current DL-PRS-RSRP report may be wrongly biased toward the NLOS path.

Figure 2:
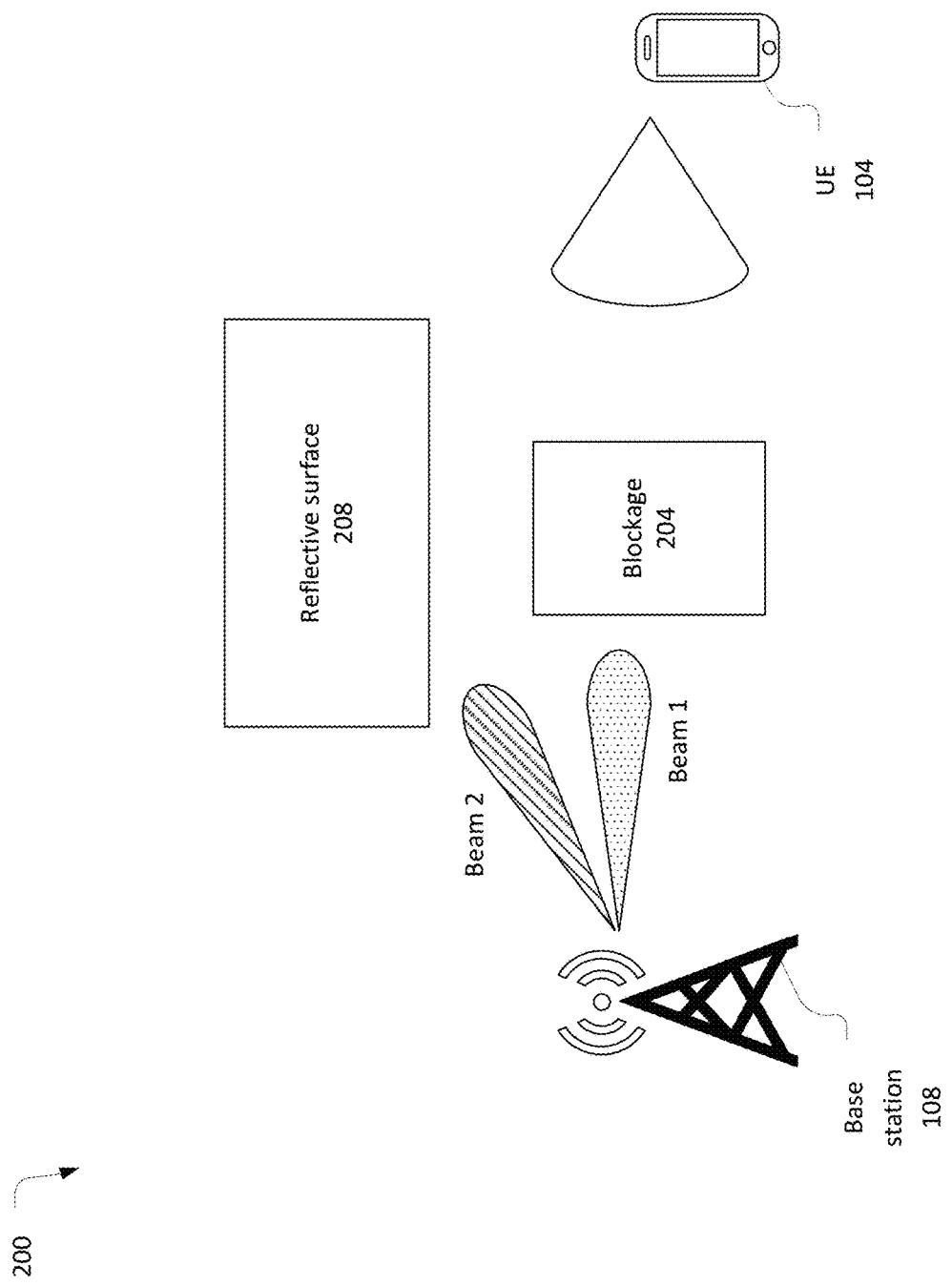
FIG. 2 illustrates a transmission scenario in the network environment in accordance with some embodiments.

FIG. 2 illustrates a transmission scenario 200 in the network environment 100 in accordance with some embodiments. In the scenario 200, the base station 108 may be transmitting reference signals that may serve as a basis for positioning measurements by two beams, beam 1 and beam 2. The reference signals may be DL-PRS.

The UE 104 may receive the DL-PRS transmitted in beam 1 via an LOS path. At least a portion of the DL-PRS transmitted by beam 1 may be blocked by blockage 204. The UE 104 may also receive the DL-PRS transmitted in beam 2 via a NLOS path due to reflection of the DL-PRS off of reflective surface 208.

Figure 3:
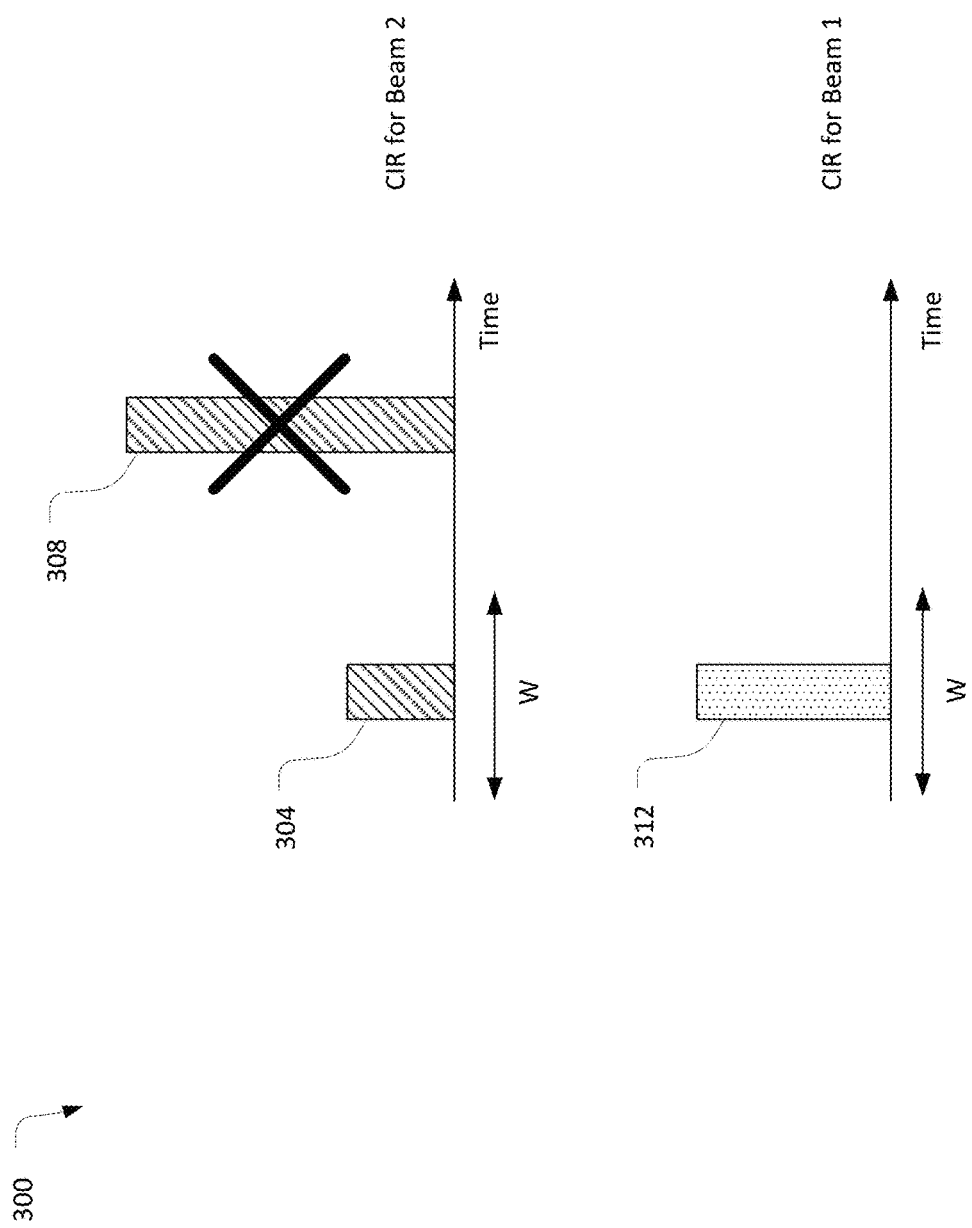
FIG. 3 illustrates channel impulse responses from reference signals transmitted by first and second beams in accordance with some embodiments.

FIG. 3 illustrates channel impulse responses (CIRs) 300 corresponding to the transmission scenario 200 in accordance with some embodiments. In particular, the CIRs 300 include, for beam 2, a first CIR 304 and a second CIR 308. The first CIR 304 may represent a LOS path from the base station 108 to the UE 104 through the blockage 204. This may be from a side lobe that is adjacent to the main lobe of beam 2. The second CIR 304 may represent a NLOS path from the base station 108 to the UE 104 off of the reflective surface 208. The CIRs 300 may also include, for beam 1, CIR 312 that represents a LOS path from the base station 108 to the UE 104 through the blockage 204.

To avoid DL-PRS-RSRP measurements measuring both CIR 304 (from LOS path) and CIR 308 (from NLOS path), embodiments introduce a time window (W) that may be used for UE-based or UE-assisted DL-AoD positioning operations. The DL-RSRP for positioning, for example, DL-PRS-RSRP, of reference signals received within the time window may be measured and used as a basis for related positioning operations. Any power received from reference signal paths outside of the timing window may be ignored. This may reduce or eliminate the possibility of an NLOS RSRP (for example, from CIR 308) that is stronger than a LOS RSRP (for example, from CIR 312).

In some embodiments, the LMF 124 may provide a time window associated with each DL-PRS measurement. The LMF 124 may provide an indication of the time window in a Long Term Evolution Positioning Protocol (LPP) provide assistance data message. For example, the LMF 124 may provide an indication that the time window starts at a slot in which the UE 104 expects to receive a DL-PRS and lasts for a length of time. The location of the time window may be based on a priori knowledge of CIR such that the first LOS path arrives within the time window. For example, the LMF 124 may have some information about the location of the UE 104 based on previous measurement operations and may also include information about the transmit time of the DL-PRS. The LMF 124 may use this information to determine a time by which the UE is to expect receipt of the reference signal along an LOS path. The time window may provide a range (for example, a predetermined number of slots before/after expected receipt of the DL-PRS) to account for variances in the network.

In some embodiments, the UE 104 may define the time window associated with each PRS-RSRP measurement. The UE 104 may define the time window based on a priori knowledge similar to that described above with respect to the LMF 124 determining the time window. The UE 104 may report parameters of the defined time window (for example, starting point and length) to the LMF 124. The window parameters may be reported to the LMF 124 in an LPP provide location information message that also includes location information such as measurements performed by the UE 104 or a location determined by the UE 104.

The time window may be defined per TRP and may be fixed across all beams coming from individual TRPs. For example, FIG. 3 shows one instance of a time window. This same time window may be used for all beams used by a TRP of the base station 108 to transmit a DL-PRS.

Definition and use of the time window for performing measurements to support DL-AoD positioning operations as described with reference to FIG. 3 may be equally applicable to UL-AoA positioning operations. For example, to increase positioning accuracy of an UL-AoA positioning technique, the LMF 124 may provide time window information to selected TRPs. The information may indicate a time window in which a particular TRP shall perform UL-SRS-RSRP measurements associated with each UE's SRS transmission for paths received within the time window.

The window configuration may be the same or different for selected TRPs in an UL-AoA positioning method. Similar to that described above, the window configuration may be based on expected time a signal transmitted from the UE 104 may be received by a corresponding TRP along its LOS path.

In some embodiments, to facilitate use of the time window for UL-AoA positioning methods, the TRP measurement request information that may be transferred from the LMF 124 to the base station 108 may be updated to include configuration information related to the time window. For example, Table 8.13.2.3-2 of TS 38.305 may be updated to include parameters such as starting point and length of the time window.

In some embodiments, a TRP may include an indication in a report to the LMF 124 of whether a time window was used to obtain a corresponding measurement, for example, a UL-SRS-RSRP measurement. If a time window was used, the report may include configuration information related to the time window. In some embodiments, the report transmitted from the TRP to the LMF 124 may be an NR Positioning Protocol A (NRPPa) measurement response message.

Figure 4:
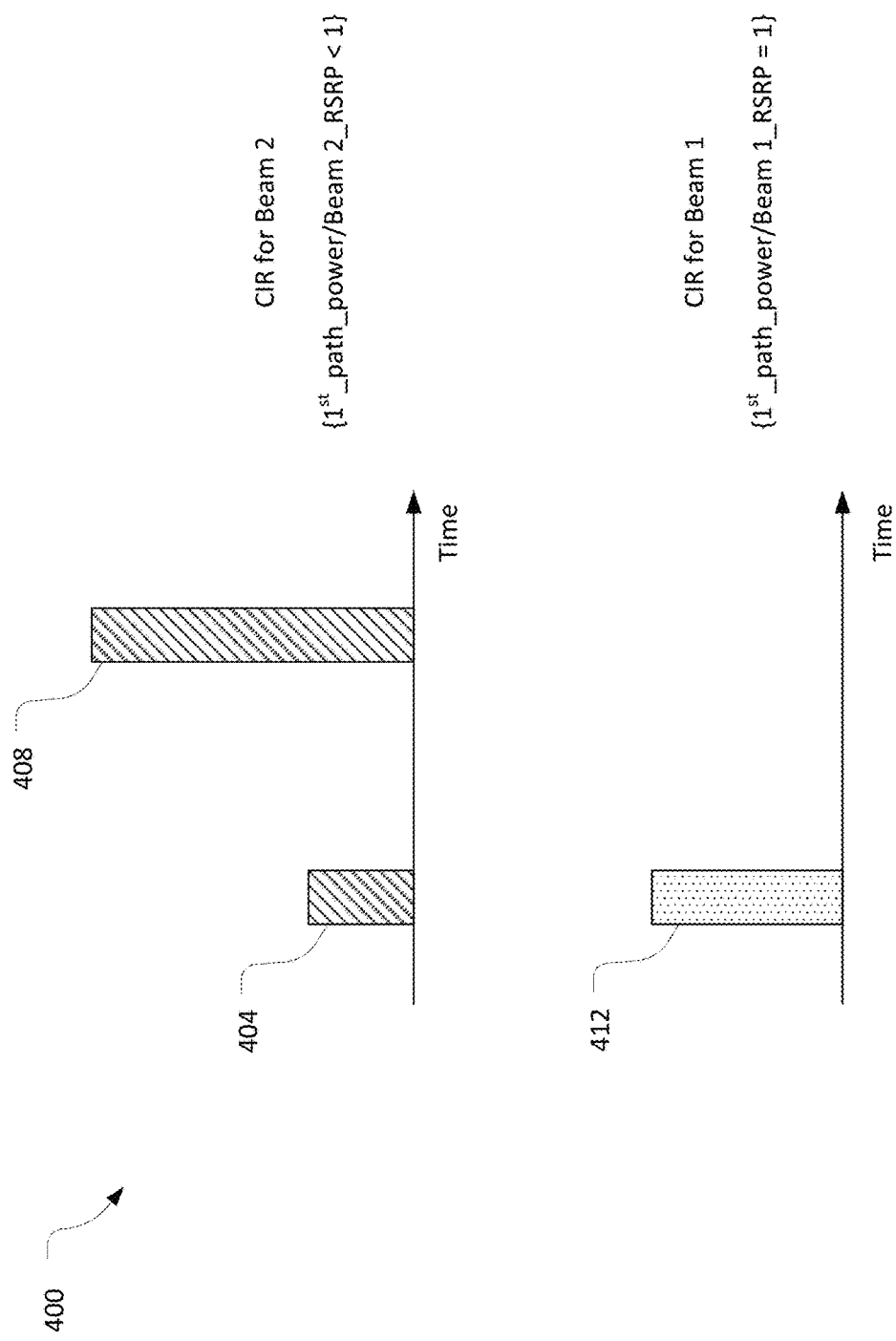
FIG. 4 illustrates channel impulse responses from reference signals transmitted by first and second beams in accordance with some embodiments.

FIG. 4 illustrates CIRs 400 corresponding to the transmission scenario 200 in accordance with some embodiments. In particular, the CIRs 400 include, for beam 2, a first CIR 404 and a second CIR 408. The first CIR 404 may represent a LOS path from the base station 108 to the UE 104 through the blockage 204. This may be from a side lobe that is adjacent the main lobe of beam 2. The second CIR 408 may represent a NLOS path from the base station 108 to the UE 104 off of the reflective surface 208. The CIRs 400 may also include, for beam 1, CIR 412 that represents a LOS path from the base station 108 to the UE 104 through the blockage 204.

In this embodiment, a relative power of a first detected path to a measured RSRP may be measured and reported for both UE-based and UE-assisted methods of a DL-AoD positioning operation.

With respect to the CIR for beam 2, a relative power value may be generated by determining a ratio of the first path power to an RSRP of the DL-PRS transmitted by beam 2. The first path power may correspond to CIR 404, while the RSRP of beam 2 may correspond to both CIRs 404 and 408. In this instance, the relative power may be less than one.

With respect to the CIR for beam 1, a relative power value may be generated by determining a ratio of the first path power to an RSRP of the DL-PRS transmitted by beam 1. Both the first path power and the RSRP may correspond to CIR 412. Thus, the relative power may be approximately one.

A relative power value may be determined/reported per PRS resource measurement. For example, a first PRS resource may be used for transmitting a first PRS by beam 1 and a second PRS resource may be used for transmitting a second PRS by beam 2. Thus, the relative power value may be determined for each of the PRS/PRS resources.

The relative power report may be provided in addition to, or instead of, a regular DL-PRS-RSRP report. For UE-assisted operations, the LMF 124 may indicate whether one or both of the relative and regular RSRP reports are desired. For UE-based operations, the UE 104 may indicate whether the location calculation is based on a regular RSRP measurement or the relative power value. This indication may be transmitted in an LPP provide location information message.

Utilizing the relative power value may enable more weight to be given to a LOS RSRP measurement. For example, with reference to FIG. 4, even though the RSRP based on the CIR 408 would be larger than an RSRP based on CIR 412, the relative power value of beam 2 is less than the relative power value of beam 1.

In some embodiments, the UE 104 may use the relative power values to select which measurements are to be reported or serve as a basis for a location calculation. This may be done whether or not the relative power value itself is actually reported to the LMF 124. For example, the UE 104 may determine that the relative power value associated with beam 1 is the higher relative power value. Based on this determination, the UE 104 may select the DL-PRS-RSRP associated with beam 1 for reporting to the LMF 124 or to serve as a basis for location calculations at the UE 104.

If an LOS path was associated with a CIR beam that was not detected at all, an NLOS may still receive a higher weight in some instances. If these instances are of concern, embodiments may utilize both the time window described above with respect to FIG. 3 and the relative power value as described with respect to FIG. 4. Combining these two techniques may provide a positioning measurement that is less compromised by NLOS paths.

Definition and use of the relative power value for performing measurements to support DL-AoD positioning operations as described with reference to FIG. 4 may be equally applicable to UL-AoA positioning operations. For example, to increase positioning accuracy of an UL-AoA positioning technique, the LMF 124 may indicate whether one or both of the relative and regular UL-SRS-RSRP measurements are to be performed or reported. The LMF 124 may provide such an indication in an NRPPa measurement request message.

In some embodiments, the base station that includes the TRP may use the relative power values to determine the UL-SRS-RSRP that is to be reported to the LMF 124 or to serve as a basis for a location calculation by the base station.

In some embodiments, to increase positioning accuracy for at least the UE-assisted DL-AoD positioning operation, the LMF 124 may indicate that the UE 104 is to perform a DL-PRS-RSRP measurement together with DL-RSTD measurements. This indication may be in an LPP request location information message. This may provide more information at the LMF 124 about a position of the UE 104 by having both DL-RSTD measurements to support DL-TDOA, which may be more robust to NLOS impact, and DL-PRS-RSRP measurements to support DL-AoD, which may be more robust to timing errors. The DL-RSTD measurements and the DL-PRS-RSRP measurements may be performed on the same reference signals from the same TRPs.

In some embodiments, a network device (for example, the UE 104, base station 108, or LMF 124) may use DL-TDOA (or UL-TDOA) to determine information relevant to defining the time window (W), for example, when to start, or how long to last. Additionally/alternatively, a network device may utilize the DL-TDOA (or UL-TDOA) measurements to validate or otherwise refine the DL-AoD measurements.

In some embodiments, the LMF 124 may provide assistance data to the UE 104 to support measurements for both DL-TDOA and DL-AoD. This assistance data may be provided by an LPP provide assistance data message. The assistance data may include the information of Table 8.12.2.1-1 and Table 8.11.2.1-1 of 3GPP TS 38.305. The information may include: physical cell IDs (PCIs), global cell IDs (GCIs), and TRP IDs of candidate NR TRPs for measurement; timing relative to the serving (reference) TRP of candidate NR TRPs; DL-PRS configuration of candidate NR TRPs; SSB information of the TRPs (the time/frequency occupancy of SSBs); spatial direction information (e.g. azimuth or elevation) of the DL-PRS Resources of the TRPs served by the gNB; geographical coordinates of the TRPs served by the gNB (include a transmission reference location for each DL-PRS Resource ID, reference location for the transmitting antenna of the reference TRP, relative locations for transmitting antennas of other TRPs); and fine timing relative to the serving (reference) TRP of candidate NR TRPs.

In some embodiments, configuration of the UE 104 to perform the joint DL-RSTD and DL-PRS-RSRP measurements may be based on a UE capability. For example, the LMF 124 may receive a capability indication from the UE 104 that indicates the UE 104 is capable of performing such joint measurements. After which, the LMF 124 may configure the UE 104 for the joint measurements. In some embodiments, the measurement time for performing the joint measurements may be increased based on the UE capabilities.

After performing the measurements, the UE 104 may transmit DL-TDOA and DL-AoD location information to the LMF 124. The location information transmitted to the LMF 124 may be a combination of Table 8.12.2.2-1 and Table 8.11.2.2-1 of 3GPP TS 38.305. The location information may include: latitude, longitude, altitude together with an uncertainty shape; PCI, GCI, and TRP ID for each measurement; DL RSTD measurement; DL-PRS-RSRP measurement; timestamp of the measurements; timestamp of location estimate; quality for each measurement; and DL-PRS receive beam index.

In some embodiments, for a UE-based positioning method, the UE 104 may perform a joint positioning calculation (for example, calculate the position based on both DL-TDOA and DL-AoD) upon receiving an indication to do so from the LMF 124 and if UE capability allows such a calculation.

The UE 104 may indicate whether a location is calculated based on single or joint positioning calculation when transmitting a provide location information message to the LMF 124.

In some embodiments, the LMF 124 may provide an indication to the base station 108 that the base station 108 is to perform both UL-RTOA and UL-SRS-RSRP measurements. This indication may be provided in an NRPPa measurement request message. Similar to the DL measurements, the base station 108 may perform such joint measurements to allow the base station 108 or network to use an UL-TDOA operation to validate, configure, or otherwise check an UL-AoA operation. For example, the UL-TDOA operation may be used to obtain information that may be used to configure the parameters of the time window (W), for example, starting point, or length.

Figure 5:
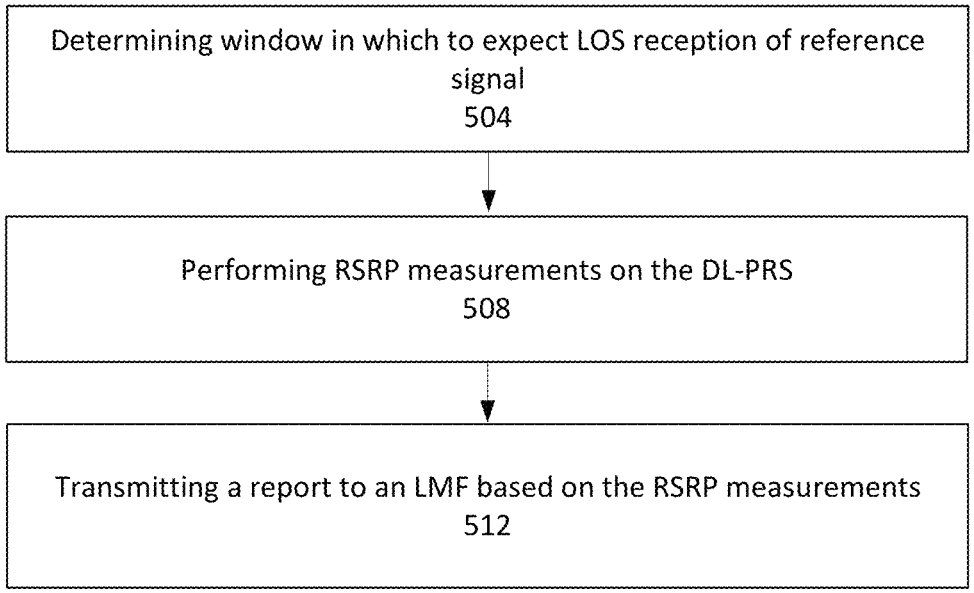
FIG. 5 illustrates an operational flow/algorithmic structure in accordance with some embodiments.

FIG. 5 illustrates an operation flow/algorithmic structure 500 in accordance with some embodiments. The operation flow/algorithmic structure 500 may be performed or implemented by a network device such as, for example, UEs 104 or 900, base station 108, or node 1000; or components thereof, for example, baseband processors 904A or 1004A.

The operation flow/algorithmic structure 500 may include, at 504, determining a window in which to expect an LOS reception of a reference signal. The window may be determined by receiving and processing a message from an LMF. The message may provide an LPP assistance data message or an NRPPa measurement request message. The message may include an indication of time window parameter such as starting point (for example, slot) and length.

In some embodiments, the determination of the window may be done at the network device performing the operation flow/algorithmic structure 500. For example, the UE may determine the parameters of a window based on previous location calculations without being provided an indication of the window by the LMF.

The operation flow/algorithmic structure 500 may further include, at 508, performing RSRP measurements on the reference signal within the window. In the event the operation flow/algorithmic structure 500 is performed by a UE, the RSRP measurements may be made on DL-PRSs that are within the window. In the event the operation flow/algorithmic structure 500 is performed by a TRP, the RSRP measurements may be SRSs that are within the window.

The operation flow/algorithmic structure 500 may further include, at 512, transmitting a report to an LMF based on the RSRP measurements. In some embodiments, for example UE-assisted or TRP-assisted positioning operations, the report may include an indication of the RSRP measurements. In other embodiments, for example UE-based or TRP-based positioning operations, the report may include an indication of a location calculation performed by the network device. In some embodiments, the report may further include an indication of the window used to perform the RSRP measurements.

Figure 6:
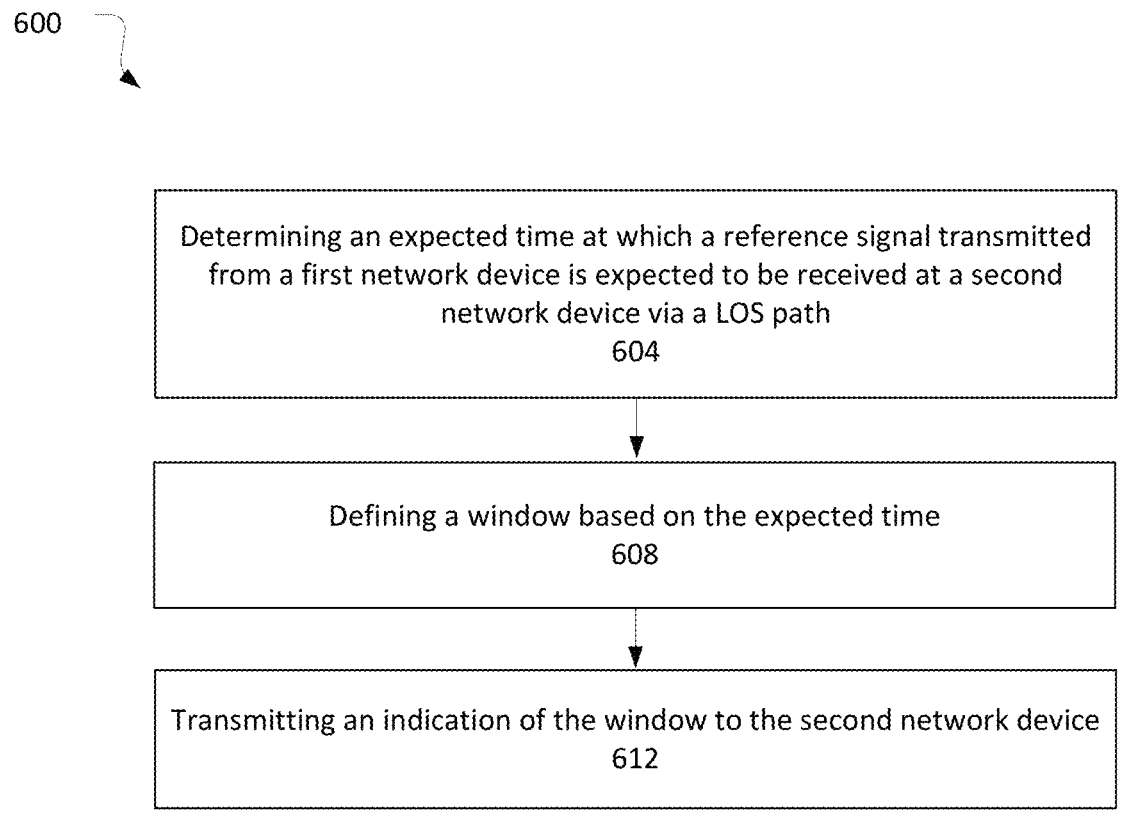
FIG. 6 illustrates another operational flow/algorithmic structure in accordance with some embodiments.

FIG. 6 illustrates an operation flow/algorithmic structure 600 in accordance with some embodiments. The operation flow/algorithmic structure 600 may be performed or implemented by a positioning server such as, for example, LMF 124; or components thereof, for example, CPU 1004B.

The operation flow/algorithmic structure 600 may include, at 604, determining an expected time at which a reference signal transmitted from a first network device is expected to be received at a second network device via an LOS path. The expected time for reference signal received may be based on scheduling information with respect to the reference signals and location information with respect to both the first and second network devices. The location information with respect to the network devices may be based on previous positioning measurement operations. These may be angle-based positioning operations or time-based positioning operations.

The operation flow/algorithmic structure 600 may further include, at 608, defining a window based on the expected time. The window may be defined to support a DL AoD positioning operation when the first network device is a UE and to support an UL AoA positioning operation when the first network device is a TRP. The window may be defined in a manner to allow the first network device to receive the reference signal via the LOS path, along with accommodating some uncertainty before and after the expected time.

The operation flow/algorithmic structure 600 may further include, at 612, transmitting an indication of the window to the second network device. The indication of the window may include window parameter such as, for example, a starting point and a length of the window. The indication may be transmitted in a provide assistance information message or a measurement request message.

Figure 7:
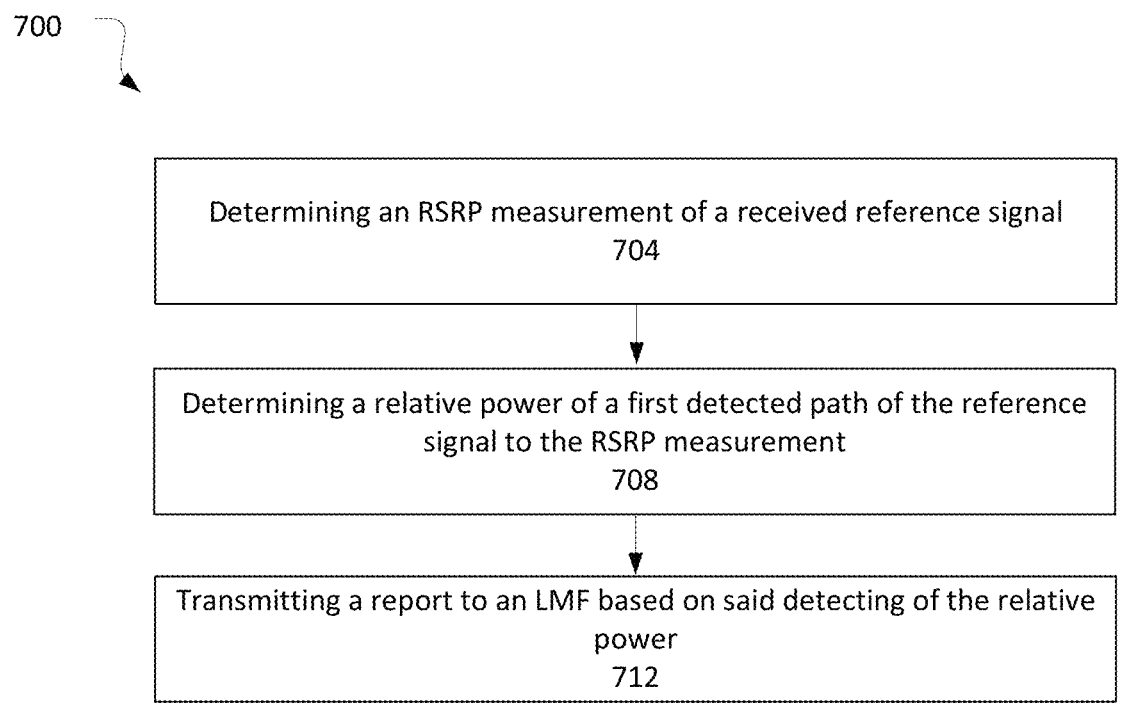
FIG. 7 illustrates another operational flow/algorithmic structure in accordance with some embodiments.

FIG. 7 illustrates an operation flow/algorithmic structure 700 in accordance with some embodiments. The operation flow/algorithmic structure 700 may be performed or implemented by a network device such as, for example, UEs 104 or 900, base station 108, or node 1000; or components thereof, for example, baseband processors 904A or 1004A.

The operation flow/algorithmic structure 700 may include, at 704, determining an RSRP measurement of a received reference signal. The RSRP measurement may be made on the signal as received by one or more paths, including both LOS and NLOS paths.

The operation flow/algorithmic structure 700 may further include, at 708, determining a relative power of a first detected path of the reference signal to the RSRP measurement. The relative power may be determined as a ratio of a first-path power value to the RSRP measurement determined at 704. The first-path power value may be composed primarily or exclusively of the reference signal as received via the LOS path.

In some embodiments, the first-path power value may be detected by determining a first peak in a CIR response and isolating the response for the basis of the measurement. Additionally/alternatively, a time window may be used to define the expected time at which the reference signal is to be received via the LOS path as discussed elsewhere herein.

In some embodiments, the determination of the total RSRP at 704 and the determination of the relative power at 708 may be done for each of the plurality of beams used to transmit the reference signal.

The operation flow/algorithmic structure 700 may further include, at 712, transmitting a report to an LMF based on the relative power. In some embodiments, the report may include the total RSRP measurement determined at 704 and the relative power measurement determined at 708. Whether to include both measurements may be based on instructions provided by an LMF.

In some embodiments, the report transmitted at 712 may only include the total RSRP measurement, which may be selected based on the relative power measurement. For example, the network device may determine which beam is associated with the highest relative power measurement and may select the total RSRP measurement corresponding to that beam to be transmitted in the report.

In some embodiments, the report may include location information calculated by the network device. This may be the case if the network devices performing a UE-based positioning operation or a TRP-based positioning operation. The report may also include an indication of whether the location information was calculated with reference to the relative power.

Figure 8:
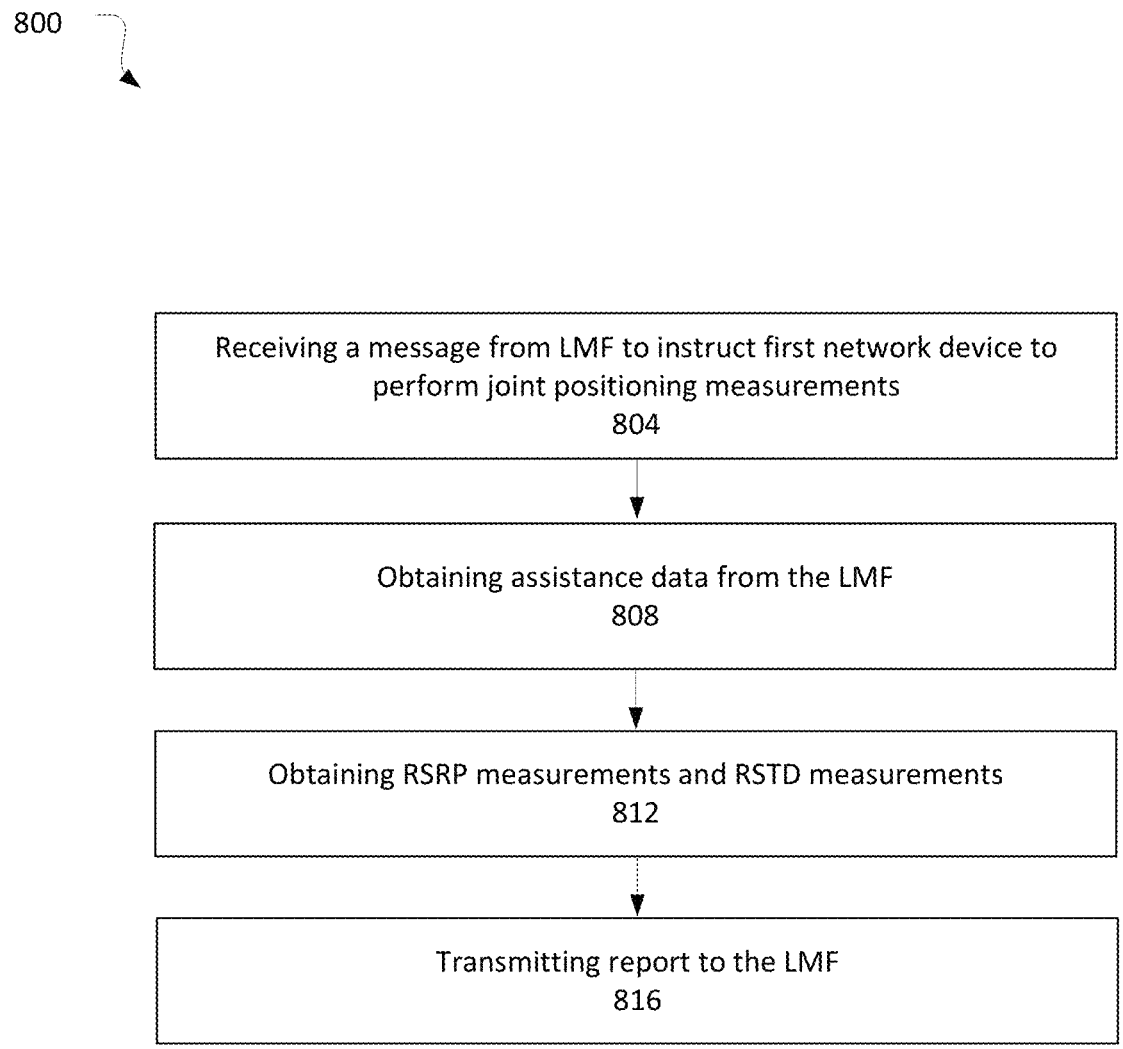
FIG. 8 illustrates another operational flow/algorithmic structure in accordance with some embodiments.

FIG. 8 illustrates an operation flow/algorithmic structure 800 in accordance with some embodiments. The operation flow/algorithmic structure 800 may be performed or implemented by a network device such as, for example, UEs 104 or 900, base station 108, or node 1000; or components thereof, for example, baseband processors 904A or 1004A.

The operation flow/algorithmic structure 800 may include, at 804, receiving a message from an LMF that instructs a first network device to perform joint positioning measurements.

The operation flow/algorithmic structure 800 may further include, at 808, obtaining assistance data from the LMF. The assistance data may be used for the RSRP/RSTD measurements. In some embodiments, the assistance data may be transmitted in the same message that includes the instruction to perform the joint positioning measurements.

The operation flow/algorithmic structure 800 may further include, at 812, obtaining RSRP measurements and RSTD measurements. The RSRP/RSTD measurements may be obtained by measuring reference signals based on the assistance data provided at 808. The same reference signals may be measured to determine both the RSRP and the RSTD measurements.

The operation flow/algorithmic structure 800 may further include, at 816, transmitting a report to the LMF based on the joint positioning measurements. The report may include the joint positioning measurements themselves, or a subset thereof, or a location position calculated based on the joint positioning measurements. The report may further include information used for the joint positioning measurements or location position calculations.

In some embodiments, the network device may use the joint measurements to perform various location operations. For example, the network device may use the RSTD measurements to perform a TDoA operation. The TDoA operation may be used to determine a time window that may be used to perform the RSRP measurements. The network device may then transmit a report to the LMF that includes the RSRP measurements or a positioning calculation based on the RSRP measurements. The report may additionally include the RSTD measurements, a result of the TDoA operation, or time window parameters that were used for the time window.

Figure 9:
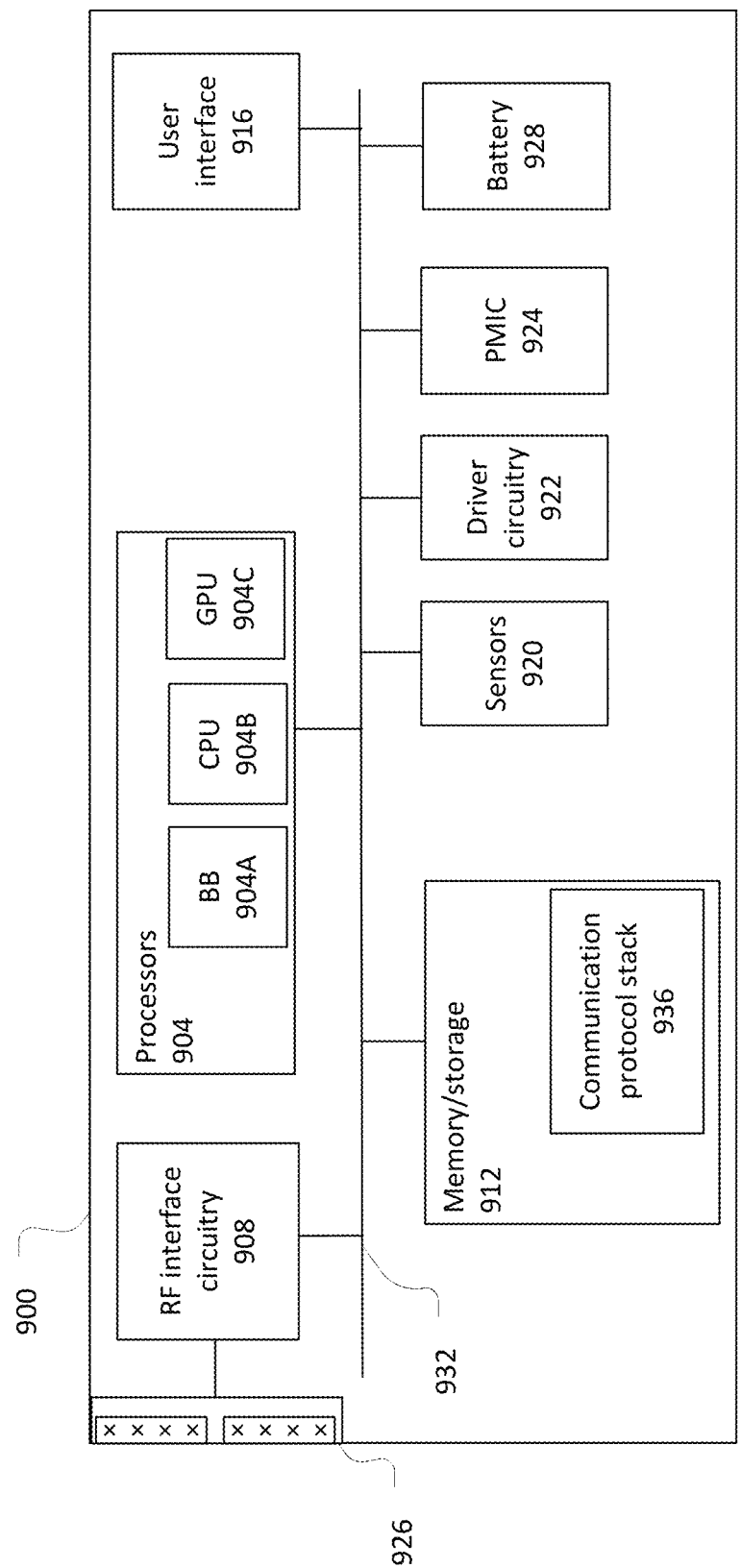
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/ monitoring devices (for example, cameras, or video cameras), wearable devices (for example, a smart watch), or Internet-of-things devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, or optical connection that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 912 may include one or more non-transitory computer-readable media that includes instructions (for example, communication protocol stack 936) that may be executed by one or more of the processors 904 to cause the UE 900 to perform various operations described herein. The memory/storage 912 may further include information relevant to the angle-based positioning measurements and location calculations. For example, the memory/storage 912 may store assistance data, measurements, window configurations, or location calculations.

The memory/storage 912 includes any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random-access memory (DRAM), static random-access memory (SRAM), erasable programmable read only memory (EPROM), electrically erasable programmable read-only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, or control circuitry.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input/multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, or headset. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs) or more complex outputs such as display devices or touchscreens (for example, liquid crystal displays "LCDs," LED displays, quantum dot displays, or projectors), with the output of characters, graphics, multimedia objects, and the like being generated or produced from the operation of the UE 1100.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, and audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900 including DRX as discussed herein.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
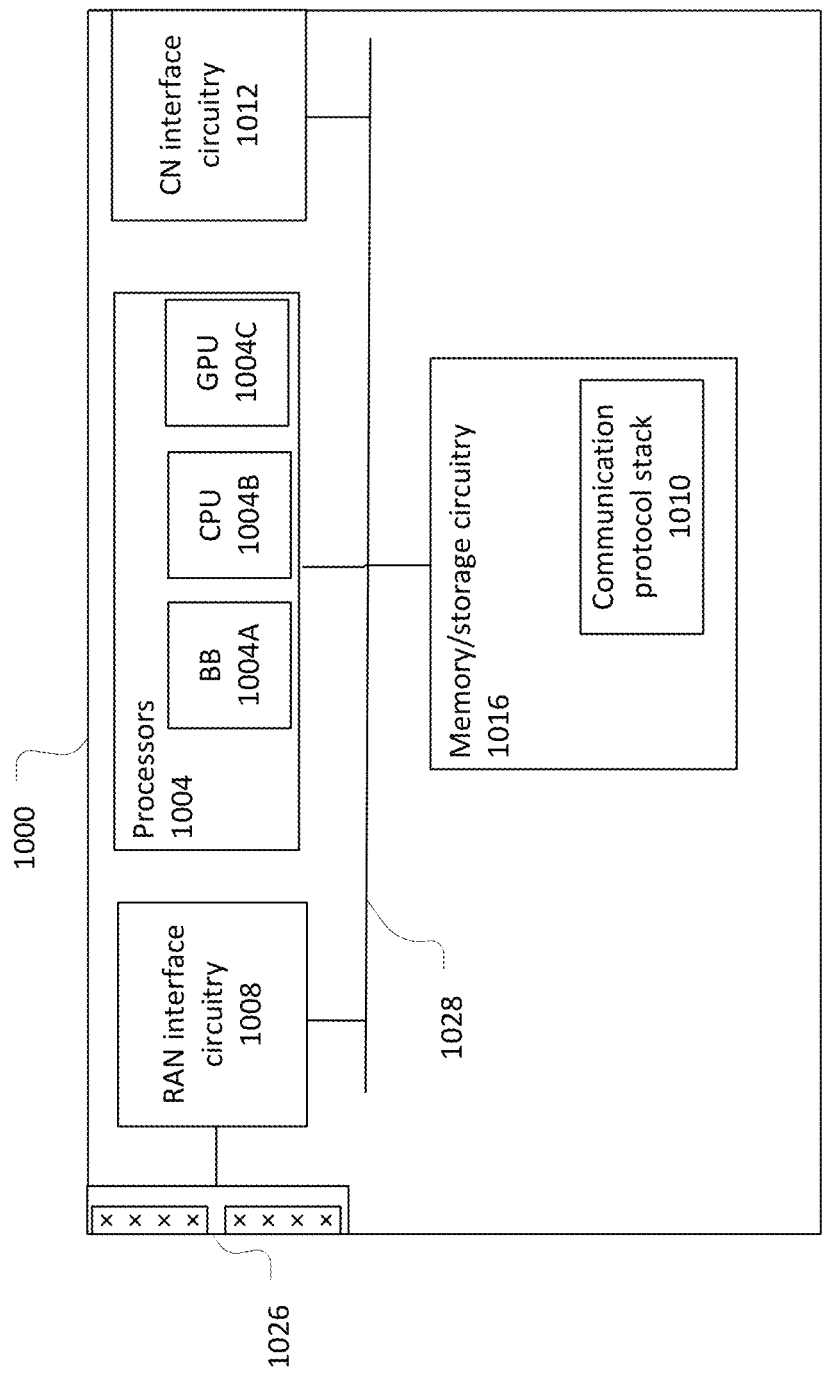
FIG. 10 illustrates a node in accordance with some embodiments.

FIG. 10 illustrates a node 1000 in accordance with some embodiments. The node 1000 may similar to and substantially interchangeable with base station 108 or LMF 124 of FIG. 1.

The node 1000 may include processors 1004, RF interface circuitry 1008, core network "CN" interface circuitry 1012, memory/storage circuitry 1016, and antenna structure 1026.

The components of the node 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 6.

The CN interface circuitry 1012 may provide connectivity to or from a core network, for example, a $5^{th}$ Generation Core network (5GC) using a 5GC-compatible network interface protocol such as carrier Ethernet protocols, or some other suitable protocol. Network connectivity may be provided to/from the node 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the node 1000 may be include TRPs within the antenna structure 1026.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element/device as described above in connection with one or more of the preceding figures may be configured to operate in accordance with one or more of the examples set forth below in the example section.

EXAMPLES

In the following sections, further exemplary embodiments are provided.

Example 1 includes a method of operating a first network device, the method comprising: determining a window at which a reference signal transmitted from a second network device is expected to be received at the first network device via a line of sight (LOS) path; performing reference signal receive power (RSRP) measurements on a reference signal received within the window to support a downlink angle-of-departure (AoD) positioning operation or an uplink angle-of-arrival (AoA) operation; and transmitting a report to a location management function (LMF) based on the RSRP measurements, the report to include the RSRP measurements or location information and an indication that the measurements were performed within the window.

Example 2 includes the method of example 1 or some other example herein, wherein: the first network device is a UE, the second network device is a transmit-receive point (TRP), the reference signal is a positioning reference signal, and the RSRP measurements are to support a downlink AoD positioning operation; or the first network device is a TRP, the second network device is a UE, the reference signal is a sounding reference signal, and the RSRP measurements are to support an uplink AoA positioning operation.

Example 3 includes the method of example 1 or some other example herein, further comprising: receiving an indication of the window in a Long Term Evolution Positioning Protocol (LPP) provide assistance data message from the LMF.

Example 4 includes the method of example 1 or some other example herein, further comprising: receiving an indication of the window in a New Radio Positioning Protocol a (NRPPa) measurement request message from the LMF.

Example 5 includes the method of example 3 or 4 or some other example herein, wherein the indication of the window includes an indication of a starting slot and a length of the window.

Example 6 includes the method of example 1 or some other example herein, wherein the first network device is a user equipment (UE), the second network device is a transmit-receive point (TRP), and the method further comprises: determining the window based on a previous positioning measurement performed by the UE; and transmitting, to the LMF, an indication of a starting point and length of the window in a provide location information message.

Example 7 includes a method of operating a location management function (LMF), the method comprising: determining, based on a first positioning measurement operation, an expected time at which a reference signal transmitted from a first network device is expected to be received at a second network device via a line of sight (LOS) path, wherein the first network device is a first one of a UE or a transmit-receive point (TRP), and the second network device is a second one of the UE or the TRP; defining a window based on the expected time to support a downlink angle-of-departure (AoD) positioning operation or an uplink angle-of-arrival (AoA) operation; and transmitting an indication of the window to the second network device.

Example 8 includes the method of example 7 or some other example herein, further comprising: transmitting the indication in a provide assistance information message or a measurement request message.

Example 9 includes the method of example 8 or some other example herein, wherein the indication of the window includes an indication of a starting point and a length of the window.

Example 10 includes the method of example 7 or some other example herein, wherein the first positioning measurement operation is an angle-based positioning operation or a time-based positioning operation.

Example 11 includes a method of operating a first network device, the method comprising: determining a reference signal receive power (RSRP) measurement of a reference signal received at the first network device from a second network device; determining a relative power of a first detected path of the reference signal to the RSRP measurement; and transmitting a report to a location management function (LMF) based on said detecting of the relative power.

Example 12 includes the method of example 11 or some other example herein, further comprising: receiving, from the LMF, a message that includes a reporting metric; and including, within the report, an indication of the RSRP measurement or the relative power based on the reporting metric.

Example 13 includes the method of example 11 or some other example herein, further comprising: determining location information based on the RSRP measurement or the relative power; and including, within the report, an indication of the location information.

Example 14 includes the method of example 13 or some other example herein, further comprising: including, within the report, an indication of whether the location information is based on the RSRP measurement or the relative power.

Example 15 includes the method of example 11 or some other example herein, wherein first network device is a user equipment (UE), the second network device is a transmit-receive point (TRP), the reference signal is a downlink (DL)-positioning reference signal (PRS), and the RSRP measurement is a first RSRP measurement based on the DL-PRS as transmitted by a first transmit beam, the relative power is a first relative power based on the DL-PRS as transmitted by the first transmit beam, and the method further comprises: determining a second RSRP measurement based on the DL-PRS as transmitted by a second transmit beam; determining a second relative power of a first detected path of the DL-PRS is transmitted by the second transmit beam to the second RSRP measurement; and generating the report to include an indication of first RSRP measurement or the first relative power based on a comparison of the first relative power to the second relative power.

Example 16 includes the method of example 11 or some other example herein, further comprising: receiving, from the LMF, an indication of a window in which the reference signal is expected to be received at the first network device via a line of sight (LOS) path; and performing the RSRP measurement within the window.

Example 17 includes a method of operating a first network device, the method comprising: receiving a message from a location management function (LMF), the message to indicate that the first network device is to perform joint positioning measurements on reference signals; obtaining assistance data from the LMF; obtaining, based on the message and the assistance data, reference signal receive power (RSRP) measurements and reference signal time difference (RSTD) measurements of the reference signals; and transmitting a report to the LMF based on the RSRP measurements and the RSTD measurements.

Example 18 includes the method of example 17 or some other example herein, further comprising: performing a time difference of arrival (TDoA) operation based on the RSTD measurements.

Example 19 includes the method of example 18 or some other example herein, further comprising: determining a window in which a first reference signal of the reference signals is expected to be received at the first network device via a line-of-sight (LOS) path from a second network device based on the TDoA operation; and obtaining the RSRP measurements based on the window.

Example 20 includes the method of example 19 or some other example herein, further comprising: performing an angle of departure (AoD) or angle of arrival (AoA) operation based on the RSRP measurements.

Example 21 includes the method of example 20 or some other example herein, further comprising: calculating a location based on the AoD or AoA operation; and transmitting the report to the LMF with an indication of the location.

Example 22 includes the method of example 21 or some other example herein, wherein the report further includes an indication that the location was based on joint positioning measurements.

Example 23 includes the method of example 17 or some other example herein, wherein the report includes a provide location information (PLI) message.

Example 24 includes a method of operating a network device, the method comprising: performing measurements on reference signals to support an angle of departure (AoD) or angle of arrival (AoA) positioning operation; generating a report based on the measurements, the report to include an indication of whether effects of non-line of sight paths of the reference signals were identified or mitigated in performing of the measurements; and transmitting the report to a location management function.

Example 25 includes the method of example 24 or some other example herein, further comprising: mitigating the effects of NLOS paths of the reference signals by performing the measurements based on a time window or by determining a relative power of a first path of a reference signal of the reference signals to a reference signal receive power (RSRP) of the reference signal.

Example 24 may include an apparatus comprising means to perform one or more elements of a method described in or related to any of examples 1-25, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 26 may include an apparatus comprising logic, modules, or circuitry to perform one or more elements of a method described in or related to any of examples 1-25, or any other method or process described herein.

Example 27 may include a method, technique, or process as described in or related to any of examples 1-25, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 29 may include a signal as described in or related to any of examples 1-25, or portions or parts thereof.

Example 30 may include a datagram, information element, packet, frame, segment, PDU, or message as described in or related to any of examples 1-25, or portions or parts thereof, or otherwise described in the present disclosure.

Example 31 may include a signal encoded with data as described in or related to any of examples 1-25, or portions or parts thereof, or otherwise described in the present disclosure.

Example 32 may include a signal encoded with a datagram, IE, packet, frame, segment, PDU, or message as described in or related to any of examples 1-25, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 34 may include a computer program comprising instructions, wherein execution of the program by a processing element is to cause the processing element to carry out the method, techniques, or process as described in or related to any of examples 1-25, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a first network device to:
    determine a window, based on a channel impulse response, at which a reference signal transmitted from a second network device is expected to be received at the first network device via a line of sight (LOS) path;
    perform reference signal receive power (RSRP) measurements, based on a first-detected path, on a reference signal received within the window to support a downlink angle-of-departure (AoD) positioning operation or an uplink angle-of-arrival (AoA) operation; and
    transmit a report to a location management function (LMF) based on the RSRP measurements, the report to include the RSRP measurements or location information, and an indication that the RSRP measurements were performed within the window.

2. The one or more non-transitory computer-readable media of claim 1, wherein: the first network device is a UE, the second network device is a transmit-receive point (TRP), the reference signal is a positioning reference signal, and the RSRP measurements are to support a downlink AoD positioning operation; or the first network device is a TRP, the second network device is a UE, the reference signal is a sounding reference signal, and the RSRP measurements are to support an uplink AoA positioning operation.

3. The one or more non-transitory computer-readable media of claim 1, wherein the instructions, when executed, further cause the first network device to:
    receive an indication of the window in a Long Term Evolution Positioning Protocol (LPP) provide assistance data message from the LMF.

4. The one or more non-transitory computer-readable media of claim 1, wherein the instructions, when executed, further cause the first network device to:
    receive an indication of the window in a New Radio Positioning Protocol a (NRPPa) measurement request message from the LMF.

5. The one or more non-transitory computer-readable media of claim 3, wherein the indication of the window includes an indication of a starting slot and a length of the window.

6. The one or more non-transitory computer-readable media of claim 1, wherein the first network device is a user equipment (UE), the second network device is a transmit-receive point (TRP), and the instructions, when executed, further cause the device to:
    determine the window based on a previous positioning measurement performed by the UE; and transmit, to the LMF, an indication of a starting point and length of the window in a provide location information message.

7. A method for operating a first network device, the method comprising:
  determining a window, based on a channel impulse response, at which a reference signal transmitted from a second network device is expected to be received at the first network device via a line of sight (LOS) path;
  performing reference signal receive power (RSRP) measurements, based on a first-detected path, on a reference signal received within the window to support a downlink angle-of-departure (AoD) positioning operation or an uplink angle-of-arrival (AoA) operation; and
  transmitting a report to a network node based on the RSRP measurements, the report to include the RSRP measurements or location information, and an indication that the RSRP measurements were performed within the window.

8. The method of claim 7, wherein: the first network device is a UE, the second network device is a transmit-receive point (TRP), the reference signal is a positioning reference signal, and the RSRP measurements are to support a downlink AoD positioning operation; or the first network device is a TRP, the second network device is a UE, the reference signal is a sounding reference signal, and the RSRP measurements are to support an uplink AoA positioning operation.

9. The method of claim 7, further comprising:
  receiving an indication of the window in a Long Term Evolution Positioning Protocol (LPP) provide assistance data message from the network node.

10. The method of claim 7, further comprising:
  receiving an indication of the window in a New Radio Positioning Protocol a (NRPPa) measurement request message from the network node.

11. The method of claim 7, wherein the indication of the window includes an indication of a starting slot and a length of the window.

12. The method of claim 7, wherein the first network device is a user equipment (UE), the second network device is a transmit-receive point (TRP), and the method further comprises:
  determining the window based on a previous positioning measurement performed by the UE; and
  transmitting, to the network node, an indication of a starting point and length of the window in a provide location information message.

13. A first network device, comprising:
  radio frequency interface circuitry; and
  processing circuitry coupled with the radio frequency interface circuitry, the processing circuitry to:
    determine a window, based on a channel impulse response, at which a reference signal transmitted from a second network device is expected to be received at the first network device via a line of sight (LOS) path;
    perform reference signal receive power (RSRP) measurements, based on a first-detected path, on a reference signal received within the window to support a downlink angle-of-departure (AoD) positioning operation or an uplink angle-of-arrival (AoA) operation; and
    generating a report for transmission to a network node based on the RSRP measurements, the report to include the RSRP measurements or location information, and an indication that the RSRP measurements were performed within the window.

14. The first network device of claim 13, wherein: the first network device is a UE, the second network device is a transmit-receive point (TRP), the reference signal is a positioning reference signal, and the RSRP measurements are to support a downlink AoD positioning operation; or the first network device is a TRP, the second network device is a UE, the reference signal is a sounding reference signal, and the RSRP measurements are to support an uplink AoA positioning operation.

15. The processing circuitry of claim 13 to:
  receive an indication of the window in a Long Term Evolution Positioning Protocol (LPP) provide assistance data message from the network node.

16. The processing circuitry of claim 13 to:
  receive an indication of the window in a New Radio Positioning Protocol a (NRPPa) measurement request message from the network node.

17. The first network device of claim 13, wherein the indication of the window includes an indication of a starting slot and a length of the window.

18. The first network device of claim 13, wherein the first network device is a user equipment (UE), the second network device is a transmit-receive point (TRP), and the processing circuitry to:
  determine the window based on a previous positioning measurement performed by the UE; and
  transmit, to the network node, an indication of a starting point and length of the window in a provide location information message.

* * * * *